United States Patent [19]
Heagle et al.

[11] Patent Number: 5,939,974
[45] Date of Patent: *Aug. 17, 1999

[54] SYSTEM FOR MONITORING FOOD SERVICE REQUIREMENTS FOR COMPLIANCE AT A FOOD SERVICE ESTABLISHMENT

[75] Inventors: Ronald J. Heagle, Longboat Key, Fla.; Wayne K. Spillner, Wilbraham, Mass.

[73] Assignee: Food Safety Solutions Corp., Longboat Key, Fla.

[*] Notice: This patent is subject to a terminal disclaimer.

[21] Appl. No.: 09/032,678

[22] Filed: Feb. 27, 1998

[51] Int. Cl.⁶ .................................................. G08B 29/00
[52] U.S. Cl. ......................... 340/286.09; 340/825.06; 340/825.07; 340/573.1; 395/215
[58] Field of Search ................ 340/286.09, 505, 340/310.06, 825.06–825.13, 825.35, 825.3, 825.31, 573.1; 395/215; 364/146, 188

[56] References Cited

U.S. PATENT DOCUMENTS

| | | | |
|---|---|---|---|
| 3,967,478 | 7/1976 | Guinn | 70/144 |
| 4,254,472 | 3/1981 | Juengel et al. | 364/900 |
| 4,325,223 | 4/1982 | Cantley | 62/126 |
| 4,375,637 | 3/1983 | Desjardins | 340/521 |
| 4,538,138 | 8/1985 | Harvey et al. | 340/524 |
| 4,567,557 | 1/1986 | Burns | 364/145 |
| 4,851,822 | 7/1989 | Barnett | 340/635 |
| 4,919,950 | 4/1990 | Mak | 426/233 |
| 4,920,333 | 4/1990 | Barr et al. | 340/545 |
| 4,924,417 | 5/1990 | Yuasa | 364/550 |
| 5,006,976 | 4/1991 | Jundt | 364/184 |
| 5,165,465 | 11/1992 | Kenet | 340/825.06 |
| 5,202,666 | 4/1993 | Knippscheer | 340/573 |
| 5,218,344 | 6/1993 | Ricketts | 340/573 |
| 5,309,351 | 5/1994 | McCain et al. | 364/132 |
| 5,321,629 | 6/1994 | Shirata et al. | 364/551.01 |
| 5,375,150 | 12/1994 | Scarola et al. | 376/216 |
| 5,394,447 | 2/1995 | Scarola et al. | 376/259 |
| 5,465,082 | 11/1995 | Chaco | 340/825.54 |
| 5,497,141 | 3/1996 | Coles et al. | 340/309.15 |
| 5,670,945 | 9/1997 | Applonie | 340/573 |
| 5,689,229 | 11/1997 | Chaco et al. | 340/286.07 |
| 5,739,760 | 4/1998 | Hatakeyama | 340/825.15 |

OTHER PUBLICATIONS

Toshiba Corporation's "Housekeeping Application With Bus Line And Telecommunication", IEEE Transactions on Consumer Electronics, vol. CE–32, No. 3, Aug. 1986; pp. 558–565.

*Primary Examiner*—Jeffery A. Hofsass
*Assistant Examiner*—Sihong Huang
*Attorney, Agent, or Firm*—Kenneth P. Glynn, Esq.

[57] ABSTRACT

The present invention relates to a system for monitoring and controlling food service requirements in a food service establishment. It includes a main computer with appropriate peripherals and an interface unit. The interface unit is connected to the main computer and is also connected to a plurality of monitoring devices, some of which monitor essential food establishment functions, such as temperatures, motion detectors, sanitary areas and the like, while others monitor employee activities. The interface unit is also connected to a plurality of control devices which both monitor and control essential activities, including sanitation, temperature, signals for smoke detection, pH levels, inventory and employee activities. Portable instruments are included with connection capabilities to the interface unit, and employee identification devices are also included.

14 Claims, 4 Drawing Sheets

SYSTEM FOR MONITORING FOOD SERVICE REQUIREMENTS FOR COMPLIANCE AT A FOOD SERVICE ESTABLISHMENT

BACKGROUND OF THE INVENTION

1. Field of the Invention

The present invention relates to systems for monitoring food service operating, performances, safety and correction actions requirements at a food service establishment. More specifically, it relates to a universal system for monitoring compliance with respect to food itself, as well as food storage and preparation and further includes monitoring of both employees and the facility physical conditions at such an establishment. The system includes both monitoring functions and control functions with interactive work stations.

2. Information Disclosure Statement

The following represents prior art which is representative of various types of food related and sanitation related monitoring systems:

U.S. Pat. No. 3,967,478 to Stanley G. Guinn describes an apparatus for unlatching a door to a hygienic area actuated by sensor electrodes in contact with the electrolytic residue of a cleansing agent upon the hand or limb of a person desiring access to the hygienic area.

U.S. Pat. No. 4,254,472 to Richard O. Juengel et al describes a remote metering system for monitoring, collecting, analyzing, transmitting and displaying data generated by a plurality of metering devices. A controller, preferably a microprocessor, stores the continually up-dated data, analyses it, and initiates transmission of the data to at least one remote data receiving device. The data transmission from the controller is in serial format and includes a plurality of different channels, with at least one channel corresponding to a combination of selected data associated with different metering devices. A scaling factor can be applied to particular metering data prior to transmission, for example, so as to provide cost analyses. The remote data receiving device includes the capability of receiving and displaying data corresponding to any of the output data transmission channels from the controller.

U.S. Pat. No. 4,325,223 to Robert J. Cantley describes a system and method for managing energy in large refrigeration systems and the like by continuously monitoring operating parameters and controlling to optimize the refrigeration system elements. A multiplicity of remote sensors is disposed at the appropriate points in the refrigeration system to produce analog electrical signals representative of various temperatures such as wet bulb temperature, dry bulb temperature, condensing temperature, evaporator air temperature, evaporator refrigerant temperature, and similar temperatures, and various pressures such as head pressure, booster suction pressure, intermediate suction pressure, and the like. A signal processor is provided to receive signals from the sensors, to condition the analog signals, convert to digital signals and to feed a digital computer which has a memory for storing system design parameters and refrigerant characteristics. The digital computer calculates the instantaneous system operating parameters from the digital signals, compares these parameters to the design parameters, and operates control relays to load and unload compressors to maintain optimum system pressures, to energize and deenergize fans and pumps in accordance with the system requirements, and to produce alarms when non-condensible gasses and/or fouled condensers are indicated in the refrigeration system. In systems subject to frost build up on the evaporator, defrost cycles are also controlled by the computer to occur only when necessary.

U.S. Pat. No. 4,375,637 to Paul A. Desjardins describes a fully integrated alarm, communication, and building management system having a central control station and a plurality of remotely located sensing and controlling devices. Each remote device has an individual digital address, which is a parallel address present on a plurality of parallel lines. The parallel address is converted to a serial address and sent to the various remote locations where it is then reconverted to a parallel address and decoded to determine the specific device being interrogated. A multiple amplifier system is provided at the central control unit and provides communication capability involving remotely located loudspeakers and microphones. The amplifiers are provided in a dual channel arrangement so as to provide a fail-safe arrangement and a failure detector is located in each channel such that if a selected amplifier channel fails, the back-up or redundant channel is immediately switched into use. A number of controlling devices or actuating devices may be employed which operate in conjunction with the sensing devices and a programmable read only memory, or a programmable multiplexer, located at the central control unit. Each remotely located controlling or actuating device also has associated with it an individual parallel digital address and upon the occurrence of a signal from a sensing unit indicating a condition other than a normal condition and a specific address programmed into the programmable read only memory or the multiplexer a command signal will be issued to the remotely located actuating or controlling device causing such device to operate in a predetermined manner.

U.S. Pat. No. 4,538,138 to Roy L. Harvey et al describes a security system continuously monitoring a plurality of spatially diverse events which are reportable to a central monitoring facility, the system including a controller for sequencing the performance of reporting and monitoring tasks according to the requirements of the events. The system also performs the tasks according to a predetermined priority, in particular, alarm message queuing. In addition, alarm conditions and system operation are verified by specified communication procedures and redundancies. Furthermore, system communications capabilities include keyboard entry and output display and an interrupt facility.

U.S. Pat. No. 4,567,557 to Martin J. Burns describes a building intelligence system is disclosed that is compact in construction and includes a single cabinet within which all of the operating components are housed. The system incorporates an uninterruptable power supply, a hard-wired input board, a relay output board and a power-line carrier transmitter output. A dedicated computer is programmable through a computer interface to provide a wide range of control to such functions as energy systems, security systems, appliances, lights and other electrical electromechanical systems that are present within the building.

U.S. Pat. No. 4,851,822 to James S. Barnett describes an electronic monitoring system for a refrigerated unit that has sensing means responsive to temperature within the unit, conditions of the engine driving a compressor, security controls of the unit, all interconnected with solid state programming means in order to provide visual, audio, and transponding alarms in the event of a malfunction within the unit.

U.S. Pat. No. 4,919,950 to Stephen M. Mak describes a computer controlled, fully automatic wok cooking system which prepares stir-fried, Chinese dishes according to arbitrarily selected customer orders entered at a point-of-sale computer. The computer integrates the operation of the conveyer, cooking, dispensing, and point of sale entry devices according to the order, menu and ingredients. A conveyor belt including a plurality of woks draws the woks through a plurality of cooking stations. Each station is provided with a burner or heating element and a dispensing station controlled by the computer according to the customer entered order. Oil or condiments are added at a first station by a corresponding plurality of dispensers and at subsequent cooking stations the food ingredients are either stirred or additional spices, food ingredients, and condiments added by corresponding dispensers. At the last cooking station additional food ingredients, such as vegetables, nuts or other ingredients requiring shorter cooking times, are added and cooking is completed. The completed short order stir-fried dish is then delivered to a serving container at a delivery station. The emptied wok is advanced by the conveyor system through a plurality of cleaning stations, where the wok is inverted, washed, scoured, rinsed and dried. The cleaned and dried wok is then returned by the conveyor system to the initial cooking station to begin the cooking process again according to the then appropriate customer order.

U.S. Pat. No. 4,920,333 to Robert Barr et al describes an alarm system for monitoring an entrance/exit from a premises is provided with a dead bolt switch, timing mechanism, alarm circuitry and alarm indicator. The alarm system is activated when the dead bolt is unlocked. The alarm circuitry determines if the unlocking of the dead bolt was authorized or unauthorized. If the unlocking was unauthorized, the alarm indicator is activated. If the unlocking was authorized, the timing mechanism is activated. If the dead bolt is not relocked within the time period preset into the timing mechanism, the alarm indicator is activated. The timing mechanism may be reset by authorized persons to allow the dead bolt to remain open for additional time periods, one period at a time.

U.S. Pat. No. 4,924,417 to Hayami Yuasa describes an environmental abnormality alarm apparatus which includes a plurality of terminals connected to a transmission line and a central processing unit. A specific address is assigned to each of the terminals. The central processing unit sequentially circularly accesses the addresses of the terminals and receives a signal corresponding to a physical change such as fire, gas leakage, or burglary supplied from each terminal. Each terminal includes an alarm determination reference setting unit, a comparator for comparing the physical change signal with an alarm determination reference value, and an output unit for supplying a comparison result from the comparator. The alarm determination reference value of the alarm determination reference setting unit is set by transmitting and receiving data to and from the central processing unit.

U.S. Pat. No. 5,006,976 to Larry O. Jundt describes a process control terminal that may be used in a computer network consisting of a process control network of process controllers and an application network of host computers. The process control terminal allows a process control operator to access to both process control functions and application programs being executed by a host computer. The process control terminal includes an Ethernet controller and it emulates a standard DEC terminal in order to facilitate its use in preexisting computer systems. The process control terminal displays information relating to process control functions in a first portion of its associated CRT screen and information relating to applications programs in a second portion of the CRT screen, the second portion being exclusive of the first portion so that process control information is not overwritten by applications information. The process control terminal also includes an automatic login feature that allows an operator to automatically login to an application program without typing a username or password.

U.S. Pat. No. 5,218,344 to James G. Ricketts describes a method and system for monitoring personnel in an institution such as a correctional facility, hospital, school, military installation, and the like, includes a computer connected with one or more stationary transceivers in a defined area of the facility, and a portable transceiver unit worn by each individual who is to be monitored. The computer sends command signals to the stationary transceivers, which broadcast interrogation signals to the portable units. The portable units are configured to respond only to interrogation signals unique to that individual, and upon decoding an interrogation signal incident thereon, broadcast a response signal to the stationary transceivers. The stationary transceivers relay corresponding data to the computer, where the data is analyzed to provide an indication of the number, location and identity of the individuals. The portable transceiver units have an emergency alarm button which may be actuated by the individual in the event of an emergency, and selected portable transceiver units may also be configured to be sensitive to proximity between them. In addition, the portable units may be coded for access to vending apparatus.

U.S. Pat. No. 5,309,351 to Joseph H. McCain et al describes a data and communication system including a hand-held unit and an infrared communication satellite is used to provide for the interchange of data between a host computer, individual personal computers, the hand-held computing unit, and factory machinery, including process controllers.

U.S. Pat. No. 5,321,629 to Shigenobu Shirata et al describes a facility inspection support apparatus having portable terminal equipment for collecting on the field basis a patrol inspection result at each site of plant facilities, and a processor for receiving the patrol inspection result data collected by the portable terminal equipment and performing a necessary data process. The processor includes a data base for storing in advance a plurality of patrol inspection routes, and discrimination information of patrol inspection items included in the inspection routes, and storing the patrol inspection result data collected by the portable terminal equipment, and facility management processor for deriving the discrimination information of a patrol inspection item designated by the interactive apparatus and a past patrol inspection result data for the designated patrol inspection item, out of the data base, and transferring the discrimination information and the past patrol inspection result data to the portable terminal equipment. The portable terminal equipment includes a data memory for storing the collected patrol inspection result data, and a display device for sequentially displaying the discrimination information of patrol inspection items and the past patrol inspection result data sent from the processor in the order following the patrol inspection route.

U.S. Pat. No. 5,375,150 to Kenneth Scarola et al describes the use of alarm indication on the overview (IPSO) display to initiate diagnosis of challenges to critical functions or unavailability of success paths, and further alarm-based guidance toward ultimate diagnosis.

U.S. Pat. No. 5,394,447 to Kenneth Scarola et al describes the content of a hierarchical access to three levels of display pages containing information on critical function monitoring and success path monitoring.

U.S. Pat. No. 5,465,082 to John Chaco describes a distributed data processing network which includes multiple memory card databases at terminal nodes of the network. The network is programmed to automatically perform routine communications operations such as conveying identification information between the terminal nodes and interior nodes. The network is implemented in a hospital environment and the databases include information on patients and hospital personnel. Using the automatic communications facilities of the network patient information from the database is displayed at a nurse station when the patient initiates a nurse-call or automatically when medication, also recorded on the card, is due. In addition, the system may be used to locate hospital personnel and equipment, to audit the use of controlled substances and to automatically assemble emergency response teams.

U.S. Pat. No. 5,497,141 to Marshall R. Coles et al describes an alert system for alerting a supervisor when an employee has worked beyond a predetermined time limit. The alert system comprises a time collection device that is interfaced with at least one alarm device. The time collection device is selectably operable to detect the input time when the employee clocks in and to generate an alert message when the employee works beyond a predetermined time limit. The predetermined time limit is set to a predetermined amount of time before a potential labor control violation, such as a violation of child labor laws or a violation of wage and hour laws, is about to occur. The time collection device comprises an input device interfaced with a controller which has the predetermined time limit stored in memory. The time collection device also includes a timer that is interfaced with the controller. The timer records the time that the employee clocks in and monitors the elapsed time after the input time. The alert system is operative to detect when the elapsed time exceeds the predetermined time limit and to send an alert signal from the controller to a selected alarm device.

U.S. Pat. No. 5,670,945 to Alan R. Applonie describes a self-monitoring, hand-sanitizing station having a basin capable of holding an antiseptic solution to be situated near the entrance to a food handling area. A first proximity detector determines when an individual is approaching both the basin and the entrance. The basin contains a first moisture-proof switch and a second moisture-proof switch the activation of which switches must be done simultaneously; these switches are situated so that a user cannot accomplish such simultaneously activation with a single hand. A second proximity detector determines when an individual has passed beyond the basin towards the entrance. And a logic unit receives electrical inputs from the first proximity detector, the second proximity detector, the first moisture-proof switch and the second moisture-proof switch to determine when an individual has approached both the basin and the entrance but passed beyond the basin toward the entrance without having simultaneously activated the first moisture-proof switch and the second moisture-proof switch. When such a determination is made, an output signal is generated by the logic unit, which output signal activates an alarm.

Notwithstanding the prior art, the present invention is neither taught nor rendered obvious thereby.

SUMMARY OF THE INVENTION

The present invention relates to a system for monitoring and controlling food service requirements in a food service establishment. It includes a main computer with appropriate peripherals (including work station monitors) and an interface unit. The interface unit is connected to the main computer and is also connected to a plurality of monitoring devices, some of which monitor essential food establishment functions, such as temperatures, motion detectors, sanitary areas and the like, while others monitor employee activities. The interface unit is also connected to a plurality of control devices which both monitor and control essential activities, including sanitation, temperature, signals for smoke detection, Ph levels, inventory and employee activities. Portable instruments are included with connection capabilities to the interface unit, and employee identification devices are also included.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

The present invention is a system for monitoring food service requirements for safety and performance compliance (food storage conditions, employee facility, security, etc.) at a food service establishment which includes unique interactive sensing and communication devices. These devices are computer(s), instruments and monitors capable of determining or measuring parameters such as position, pH count, moisture, temperature, operator actions and other parameters as needed which are added to key food service establishment work stations, interfacing with the establishment crew by signaling to them whenever it is time to take certain measurements and/or actions necessary to maintain proper operating conditions. These conditions may include security, safety (facility and food), sanitation level and personnel hygiene. Each network device is polled by a computer or a Central Processing Unit (CPU) for on-going status updates. For example, when an out of limits condition is detected, that work station, the manager and possibly operators, mechanics or organizations (i.e. police or fire station) are automatically alerted or paged. Thus, the present invention system advises them that there is a system upset, so that they may take appropriate and prompt remedial action.

The CPU software of the present invention system incorporates a history of appropriate operator actions (normal or remedial) to be taken whenever a system alert signal is received; each situation is assigned to a unique code number or other identifier displayed on the pagers and/or work station monitor (WSM). Code books provided with the pagers and decoding charts posted at the work station may be used, e.g. when code numbers are used, to describe in-depth and/or to provide a simplified checklist for the appropriate actions that should be taken to respond to each alert prompt received.

Once the proper response occurs, it is either automatically sensed by the WSM using an integral instrument or the employee manually enters information or a code that the required actions have taken place. Usually this will require using a computer key board or other key board, a touch pad and/or hand held instrument (such as a digital thermometer) that communicates with the CPU through the WSM by providing coded signals identifying what measurements and/or specific actions have occurred. Other data measurements, supplied by other on-line instruments, are entered as the CPU polls for them. The system documents all such activity and the time of day each occurred, if any actions were remedial in nature—as well as when the process returned to normal (and, if desired, what action has been taken).

Should the product quality of a particular food or liquid supply be questionable, additional quantified measurements are necessary. The obtained information dictates if the questionable product may be used or must be discarded. Separate operator responses using a WSM confirm that the proper action was executed. Should the remedial action suggested by the CPU not be the only course of action and the manager on duty elects to proceed differently, then that decision is entered using a conventional keyboard or other appropriate device. The action taken and the CPU's recommendation are both recorded in the system memory, enabling management or even government review, as well as future CPU suggestions to be changed or modified, based on the experienced results.

To monitor activity that requires motion or travel between work stations, sensors, portable hand held instruments, self contained (battery powered) badges and/or pagers with imbedded unique identification codes, electronic circuitry, alert and status lights, horns, memory, timers and/or transceivers may be used to communicate with the CPU using any appropriate network device or WSM. For example, hand held instruments may download the data obtained through communication ports (comport) once all the necessary samples are taken. The time at which these activities occurred and the identification of what each entry represents would be maintained in memory and entered using recognizable code numbers.

For some tasks which must be executed occasionally or periodically to maintain the desired system performance (i.e. preventative maintenance items), the CPU tracks and schedules these events. For example, a listing and description of the steps needed to complete these specific events may be printed daily. The responsible employee enters each task's completion, including any associated data obtained using the code numbers provided on the print out, to reinitiate their scheduling cycle.

A food service industry establishment may be any food processor, institution, restaurant, supermarket, caterer, butcher, convenience store, employee dining, school cafeteria, etc. In the present invention system, an integrated interactive network has been developed which incorporates instruments, sensors, transmitters, transceivers, a central microprocessor or computer, printers, motion detectors, audible alerts, hand held multi-probe thermometers, control panels, proprietary software, pagers and/or unique individual identification badges to improve performance while protecting public health, by monitoring the entire operation. Food handling procedures, crew activities, sanitation and housekeeping elements, preventative maintenance requirements, building mechanical-energy optimization master controller schemes, employee record keeping, inventory control and appliance status within an operation are included in preferred embodiments and are managed with the work stations, employees or managers receiving alert prompts on the actions that must be taken to consistently operate or perform within established parameters and standards. This present invention network arrangement enables a novice manager or employee to utilize pre-established criteria and be prompted to take appropriate actions, ensuring that only safe, healthful food products are served to the public just as a seasoned veteran would. The designated critical points and actions are documented and logged to comply with regulatory guidelines and requirements. The system is adaptive and readily modified to meet the specific needs of every food service establishment using it as priorities and expectations change and modified responses are deemed necessary. The concept is modularized such that existing elements, appliances, hardware and software already in the operation may continue to be utilized. It is not necessary to implement the entire network, as described, to profit from its performance enhancements depending on the operation's desire to utilize the interactive employee self prompting alerts and feedback, recommended remedial actions, record keeping and performance control-monitoring capabilities that have been designed into each subsystem and standard WSM.

This invention incorporates tailored time monitoring for the operation's various activities, unique interactive communication devices and instrumentation, assigning a unique numeric code to each activity that is monitored so the CPU (Central Processing Unit) can recognize and process the information it receives from the various network devices. Whenever more data sampling is needed, or an upset condition is detected, requiring operator action to help maintain the proper performance characteristics or documentation of the operation, that person and/or work station is alerted and prompted by the CPU to act accordingly. The proper worker response is either automatically sensed or manually entered by that individual using appropriate network devices, generally a WSM, by simple mechanical actions, through instrumentation and/or coded entries. The principal motive for this interactive network is to maintain control of the food processing methods and employee involvement in this process ensuring compliance with the latest HACCP (Hazard Analysis of Critical Control Points) and the Federal Government's Model Food Code Guidelines. The record keeping associated with these programs is managed better; this objective network documentation is more credible since operator bias has been eliminated from each data entry. The network is able to be customized for the specific menu or food products being handled. The system is readily expanded to monitor the status of key equipment like freezers, holding cabinets, blast chillers, dish machines and refrigerators outfitted with on-line instrumentation. The manager-in-charge or other designated responsible person is immediately alerted whenever a deviation from the acceptable performance criteria (time, temperature, relative humidity, age et al) is detected since the CPU automatically rings the designated pagers, so the needed remedial actions may be taken. The CPU documents each such occurrence, the remedial action and when acceptable performance conditions were restored. The automatic alert signal which prompts operators through the needed action steps, makes this novel system workable and quite reliable.

The preferred embodiment of this innovative network consists of the following components:
  A. A CPU, either a multi-tasking Personal Computer (PC) or a dedicated micro-processor with sufficient memory;
  B. Unique WSMs with the ability to communicate with both employees and the CPU keeping the system updated and under control using various instruments, audible alerts, status lights, timers, prompts, checklists, push buttons and numeric entry touch pads;

C. Pagers with numeric displays to alert and advise employees of the action steps needed to maintain the network's performance, up-date the records or remedy out of limit conditions;

D. Location sensors that detect motion or position and monitor potentially unsanitary locations;

E. Unique employee identification badges with imbedded timers, status lights, audible alerts, memory, transceivers and electronics that enable them to communicate with other network devices;

F. Hand held multi-probe thermometers with the ability to communicate with the CPU;

G. On-line instruments and probes monitoring key appliance parameters, that are polled by the CPU for periodic updates ensuring performance within preset standards;

H. A printer to provide hard copies of information stored by the CPU when necessary;

I. A centralized monitor and keyboard able to communicate with the CPU (adding a tablet or slate to document signatures, scanner and fax modem for external communication make the CPU and its peripheral equipment more functional and productive to maintain records);

J. Unique customized software to monitor the establishment's performance and keep records;

K. Code books, charts and procedures manuals describing the entire operation, troubleshooting, records keeping requirements and training support information are tied to the code numbers;

L. An interface station, where each device's wiring terminates, integrates these field devices into an efficient network that is bi-directionally polled by the CPU; this device incorporates a module allowing the various badges and pager-beepers to be reprogrammed so the system performance can vary as required to meet evolving business or regulatory requirements. This hardware enables the network components to interface with pre-existing data processing programs; such as using identification badges instead of time cards to help compute the payroll; and, M. Automatic sensors installed to monitor employee responsive actions and take measurements, provide this data when polled to maintain proper system or equipment cycle performance.

The following is a more detailed description of the design and performance characteristics of each network component described above to ensure the operating system performance and documentation objectives are achieved:

A. The CPU is simply a conventional microprocessor with adequate memory or a multi-tasking PC that polls and monitors the basic network devices obtaining and processing data. When an upset condition is identified, the CPU alerts the designated person or work station to take remedial action and restore the proper system performance. The CPU generates periodic reports including confirmations of necessary activities, abnormal activities and corrective action to taken, etc. and prepares summaries as a data base, in chart form, as a report or displays it graphically depending upon the business requirements or preference;

B. Each WSM is customized to meet the requirements established for each specific location, enabling effective communication with both the operators and the CPU. A WSM will generally incorporate some audible alert, push buttons and/or a numeric touch pad, a com port to accept data transmissions from portable hand held instruments (for example, an RS-232 connector from a multi-probe digital recording thermometer like an Atkins model #37313-K) as well as status lights (i.e. 3 color LEDs). Dependant on the typical activity other instrumentation and sensors, timers, magnets, transmitters and/or transceivers may be incorporated into a WSM.

Since each monitor is connected to the network using low voltage (e.g. 24 volt AC) 4 or 5 conductor wire, the installation requirements are similar to conventional POS (Point of Sale) devices. The use of proven conventional technology and standard components ensures that each WSM will perform as expected with appropriate maintenance and operator training. The CPU polls each network WSM to maintain operational control and obtain any required data. Generally an operator will use a hand held instrument or probe to measure product attributes, coupling this activity with a simple coded touch pad or push button responses provides the information required to document the system performance. In some instances the parameters or operator responses will be detected by on-line sensors and instruments integrated into the basic network. For instance, a typical prep work station would (might) integrate a touch pad, status lights, a horn, a hand held thermometer, a numeric display (LCD or LED) and a scale into its design. The operator responds to a prompt triggered by the CPU using the touch pad, after identifying the needed action using the numeric display. Using a scale, temperature probe and the touch pad, data is entered into the system's memory documenting the event. The CPU processes this data, if any corrective action is required then the appropriate employee, work station or other entity is notified by a coded alert signal;

C. The responsible manager, a mechanic or roaming operator may be alerted that their attention to a situation or upset condition is required using a conventional audible beeper or vibratory silent wireless pager with a numeric display to indicate the necessary action or repair;

D. Location or motion detectors are strategically located to advise employees when they enter a room or space that needs a prompt response and coded entry to satisfy the system design or a potentially unsanitary area (i.e. their hands should be rewashed before returning to work within an established time interval). These devices would be positioned to monitor dish rooms, scrap tables, scullery or dirty dish—pot sink areas, janitorial supply closets, the mop sink, trash compactors, utility rooms, break rooms, exit doors and similar locations. Operator notification could be from an audible alert, a flashing light or similar signal. The employee would promptly respond to these alerts at an appropriate WSM to help satisfy the specific system requirements;

E. Inter-active identification badges could be used to automatically identify employees and their behavior at selected work stations by having a self contained power source (battery powered) transceiver (i.e. infra-red or radio frequency), timer, audible signal, programmable alerts, unique identity code, status lights and memory incorporated in them. These devices are able to track various operator activities and communicate with the system using various hosts such as a WSM with a mating transceiver. The badges could be used to replace time cards or similar items while interfacing with existing accounting or scheduling software that would continue to be utilized;

F. A conventional multi-probe digital thermometer with internal memory and computer interface port would be used to gather data at remote locations not associated with a designated work station such as an upright refrigerator, a warm surface temperature, a fryer vat shortening temperature and various food product temperatures. Stationary thermometers are appropriately located and wired or connected, accordingly. Device memories could be downloaded using an acceptable com port (i.e., an RS-232 connector) integrated into the network or via radio signal;

G. If an operation has designated certain equipment, such as walk-in refrigerators and freezers, as critical units to the basic system performance, these devices may be outfitted with on-line thermostatic sensors or similar instrumentation. The new or existing instruments can be hard wired into the proposed network, allowing the CPU to poll them and identify upset conditions. When one occurs, the person responsible for its repair would be notified by pager immediately;

H. Daily, a printer will generate the hard copies of expected tasks that need to be accomplished on a regular, yet infrequent basis. This may include a checklist with a description of the required operator actions. A summary of recent site performance may be prepared for review with local health officials. The printer enables circulation of performance trends or exception reports;

I. Peripheral computer accessories like fax modems, keyboards and monitor screens can stream line the communication process. The availability of a tablet, modem and a scanner may prove useful in keeping up to date employee records or similar activities including delivery receipts;

J. Customized software is needed to properly describe the work stations that need to be monitored and what data should be collected, including the proper frequency. The specific products being handled, desired report formats, the condition and reliability of the equipment and a recommended preventative maintenance calendar affect the developed package;

K. Code books and charts explaining each specific element code are necessary for the network to perform properly. They may advise the employee of the overall purposes of the system, specific tasks for given assignments, and what action should be taken next. This material and the unique software can be combined to effectively train and educate the crew;

L. An interface box with integral power transformer, wiring terminations and badge programming station (if necessary) enables the network to operate in a coordinated manner. It simplifies the needed installation effort. The programming station allows the monitored system parameters and selected default standards and times to be altered whenever necessary. An employee badge identification code may be changed as necessary with crew turnover at this station; and, M. Other sensors may need to be permanently installed on various appliances such that selected parameters may be measured and reported to the CPU every cycle, a situation that would not practically facilitate operator interaction. Examples of this instrumentation would be internal temperature probes to identify when product is done and initiate an equipment response (i.e. a cooking computer triggering other actions such as automatic basket lifts), management of multiple batch holding— expiration times and monitoring various rack dish washer attributes (rinse temperature, water pressure and dispensing chemicals) every cycle.

In recent years, increased emphasis has been placed on preventing food borne illnesses, especially those establishments that cater to the elderly or children. In June of 1997, the Federal Government issued their latest version of a recommended national model food code and placed responsibility on each establishment to implement and enforce these standards; while suggesting that local health inspectors become compliance officers confirming that each establishment has an operative HACCP (Hazard Analysis of Critical Control Points) program in place. Hand held digital recording thermometer and data logger (i.e. chart recorders or data acquisition systems) manufacturers like Cooper, Raburn, Atkins and Davis Instruments have all developed hardware to help an operation implement effective HACCP programs, but none advise the operator when it is time to gather more data or what manual measurements to take. With frequent turnover, a simpler self-prompting system becomes a necessity. An effective HACCP program identifies when an employee has engaged in an unsanitary practice, the Net Tech Hygiene Guard monitoring system uses patented technology to alert an employee that they must rewash their hands before returning to work after entering the rest room. This system is a step in the right direction but it does not go far enough, other areas like the dish room—scullery, janitorial closet, rear exit door, break area and trash compactor need to be monitored by sensors alerting the employees that they may be carrying hand spreadable pathogens. Various food prep work stations need to be monitored and prompt the operator when potentially unsanitary practices could occur such that appropriate remedial action can be initiated (i.e. sanitize the work surface and utensils between products or food types to reduce the risk of cross contamination). The present invention system, with its unique combination of hardware and software results in a system enabling any establishment to maintain the necessary procedures and unbiased documentation required to implement and execute an effective HACCP program and to go far beyond required practice! The manager-in-charge is alerted whenever unacceptable conditions are identified by the system. It recommends remedial action that should resolve the situation, that suggested action may be followed or another alternative may be selected by the manager-on-duty. Both the suggested and actual solution are entered into the system's memory. At the end of each shift, an exception report identifying all out of limits conditions is prepared including what actions were taken and when the operation returned to normal. As desired and programmed, this may include reports on all the various batch cooking, holding and cooling operations, as well as qualifying and quantifying all the discarded product.

An effective HACCP Program addresses each of the following topics:

1. Purchasing and Receiving;
2. Storage;
3. Preparation;
4. Cooking;
5. Holding, Displaying, Transporting and Serving;
6. Cooling and Storing;
7. Reheating;
8. Cleaning and Sanitizing Utensils and Equipment;
9. Employee Training;

10. Personal Hygiene;

11. Documentation; and,

12. The condition of the Facilities and Corrective Actions.

The present invention system uniquely and objectively addresses each of these issues using unbiased evaluative criteria and various devices to ensure a productive, efficient and safe operation:

(1) All deliveries are timed and key food items are inspected for damage, weight and product temperature using a computer generated checklist, hand held thermometer, scale and a WSM.

(2) Storage facilities are monitored using the computer generated checklist to ensure appropriate, strong, clean and sanitary packaging is used, that day dots are applied to all in store prepped items, that each container is properly covered and labeled and that stock was properly rotated when placed on the shelf. The delivery door WSM is used to time each delivery; including proper inspection and storing of all key items identified on the delivery print-out; critical storage temperatures are documented every shift, on schedule, using a hand held probe.

(3) Preparation procedures are monitored using the prep work station WSMs with hand helds, instrumentation, scales, sanitizer concentration litmus strips and computer check list print outs. The check list ensures the work station is resanitized and new utensils are used every time the prepped food product batches change to reduce cross-contamination risks. The WSM monitors the operator to ensure rewashing of hands with every prepped product rotation, whenever the prep person leaves their work station and/or at an established time interval. Pre-portioned products are weighed and properly labeled. Batches of prepared mixes (like tuna salad) have their temperature recorded when put on the storage shelf. Employee actions are monitored as they must record every time they begin processing a new ingredient, when their work station was sanitized, whenever the prep sink sanitizing solution is changed, when their hands are washed and as new utensils are used to minimize the cross contamination risks.

(4) Cooking parameters (including times, internal product temperatures, equipment surface and cavity temperatures, warm up times, holding characteristics or similar attributes) are all documented using the grill station WSM. The WSM or chef's pager when required to ensure all the necessary data, is collected in a timely manner.

(5) Batch holding times and temperature as well as the equipment condition measurements are monitored in the same way that the cooking parameters are quantified. The check list requires that any discarded food be entered into the system. Food pick up areas such as heat lamps, soup and garnish stations and plate warmers would also be monitored by instruments at an established frequency ensuring the temperature performance remains with in limits.

(6) Batch cooling and storage temperatures are monitored using a thermometer probe measuring the bulk product temperatures at an established frequency as the CPU polls them.

(7) Product reheating is handled in the same manner similar to the batch cooling methods (i.e. when a batch of soup or gravy is reheated, the bulk temperature is measured and recorded)

(8) The cleaning and sanitizing of utensils is monitored using on-line instruments that monitor water temperatures at various points in the dish machine wash and rinse cycle. Detergent and rinse additive consumption is recorded. In the case of low temperature equipment, either pH meters or litmus strips are used to document the chlorine sanitizer concentration.

(9) Employee training and reinforcement is integrated and blended into the proprietary software.

(10) Personal hygiene practices are monitored using the position or motion sensors guarding each identified potentially unsanitary area in the establishment and by providing WSMs at hand s inks to time and document employee hand washing activity. This device can incorporate instrumentation and sensors to ensure water flow, the water temperature and the soap dispenser was actuated; each employee can be automatically identified by their badge or punch in a unique code number documenting their hand washing activity. The monitored steps and methodology are determined by training and the anticipated employee response to prompts.

(11) Documentation is as accurate and complete as the customized software calls for, any missing information is identified in daily exception reports enabling corrective actions and counseling.

(12) The facility condition and corrective actions are accommodated by the customized software remedial action recommendations, established operations methods and alerting the correct entity every time the CPU detects an unacceptable condition outside established standards. Integrating a preventative maintenance calendar/detection system (sense lengthening start up/heat up period indicating element fouling or failure) and housekeeping—cleaning chemical program into the software ensures that the facility is maintained in first class condition.

It is not necessary for an establishment to implement the entire program, each work station and subsystem operates as a stand alone entity; it is possible to add any element not initially adopted at a later date. The various components described by this novel interactive network, that systematically integrates instruments, operator actions, hardware, computer generated reports and alert prompts, preventative maintenance calendars, recommended remedial actions and controls enable their use to effectively support other key attributes such as energy consumption, improved equipment performance and crew productivity. The program elements readily interface with existing industry software programs such as crew scheduling, inventory control, yield analysis, heating and air conditioning management controllers, payroll and record keeping (this network allows HAZCOM, crew qualifications, specific recipe models and standard procedures to be added and maintained easily). The software modules are easily adapted to each specific location's requirements. The data is under the establishment's exclusive control—it may be maintained on site or downloaded by modem automatically to a central clearing house for tabulation and inclusion in a more comprehensive analysis of multiple locations. Coupling this monitoring system with an effective housekeeping and cleaning chemical program should reduce the risk of food borne illness protecting the public, while providing the operator with a simple, cost effective method to keep each location in peak operating condition. This monitoring system may be easily modified as organizational needs and regulatory guidelines evolve and develop over time.

Some prior art systems, such as U.S. Pat. No. 5,202,666 refers to an interactive system that advises employees when they need to wash their hands upon entering a rest room to maintain hygienic conditions but it does not function as a network operation controller, utilize time or pre-established intervals to prompt the employees or specific work stations when additional actions or quality assurance inspections and measurements are necessary, interface with record keeping devices nor does it address the specific regulatory requirements mandated by industry compliance guidelines and health departments. On the other hand, the present invention offers:

(1) The development of an interactive work station monitor (WSM) and operating methods to accompany it, that prompt the operators through their required responsive actions using charts and suggestions from the CPU. Each WSM when used properly records employee activity—who did what and when. A WSM may be used with color charts/tubes, litmus or temperature sensitive strips or selected instrumentation for the operator to enter the acquired system data.

(2) The manager or work station is alerted by a pager or similar device, when it is time to gather additional data requiring operator assistance or an out of limits condition is identified.

(3) The central micro-processor tracks the time of each occurrence and automatically polls individual network components at a set interval, comparing each device's current status with pre-established default levels. Appliances with specific operating requirements at various stages in each cycle are monitored ensuring that each intermediate condition is satisfied in every sequence. The CPU issues an alert whenever a deviation from established standards occurs.

(4) Daily, a list of activities that are executed occasionally is prepared to prompt the assigned employees of the needed actions and procedures that should be executed during their shift. Entering each task's completion resets the sequencing cycle enabling their re-scheduling.

(5) WSMs and hand held instruments capable of communicating with the network are used to enter most visual data, measurements and/or to document those activities needing operator assistance including troubleshooting or if an appliance performance is failing (i.e. part failure).

(6) The CPU uses a conventional auto-dial feature to alert the manager, work station or other entity when action is needed to maintain the operation or repair an out of limits condition.

(7) The use of an employee identification badge/pager with an imbedded transceiver, clock and unique identification code may be used to identify engagement in activities (unsanitary or otherwise) requiring an appropriate responsive action by each employee before returning to their normal work assignment. These self-contained devices are able to alert the employee that corrective action is required by use of status lights, audible alerts, vibration or similar signals.

(8) Development of an interactive HACCP compliance program with log where all objective entries are entered using an instrument or other unbiased decision method and the work station is automatically prompted when operator action is needed. The obtained data may be a written report, displayed graphically, as a chart or in spread sheet form, but it is exclusively under the establishment's control, although it may be readily sent out using a modem.

(9) Suggested remedial responses are displayed when abnormal conditions are identified and an alert alarm sent enabling rapid and consistent resolution of the issue from all shift managers.

(10) The ability to integrate menu (food items), site and employee specific requirements and criteria into a back office management tool ensuring adherence to operational standards while reinforcing and necessitating responsive operator actions. The system reports, methods and standards may be readily updated or modified as business priorities and regulations change.

(11) The ability to interface the unique features, elements and software described by this invention with existing hardware and systems to provide an integrated view of the operation complete with records and reports. This information allows each location to readily establish and implement more productive methods and comply with regulatory requirements. Selected areas may be equipped with appropriate interactive sensors (i.e. position, motion, pH, smoke, heat, magnetic, temperature, strength, moisture, timing and totalizing), that provide information to help monitor and maintain system performance and crew and regulatory compliance records.

(12) The ability to use the information provided from the various network devices and components to not only prompt the operators of the proper next actions that should be taken at their work stations but to assist in employee training efforts while constantly reminding each individual of their responsibility to preserve a safe, yet efficient work environment complying with the accepted operational methods and standards. Management may utilize the data to reinforce proper work habits and compliment the work force as the expected results are achieved.

Figure 1:
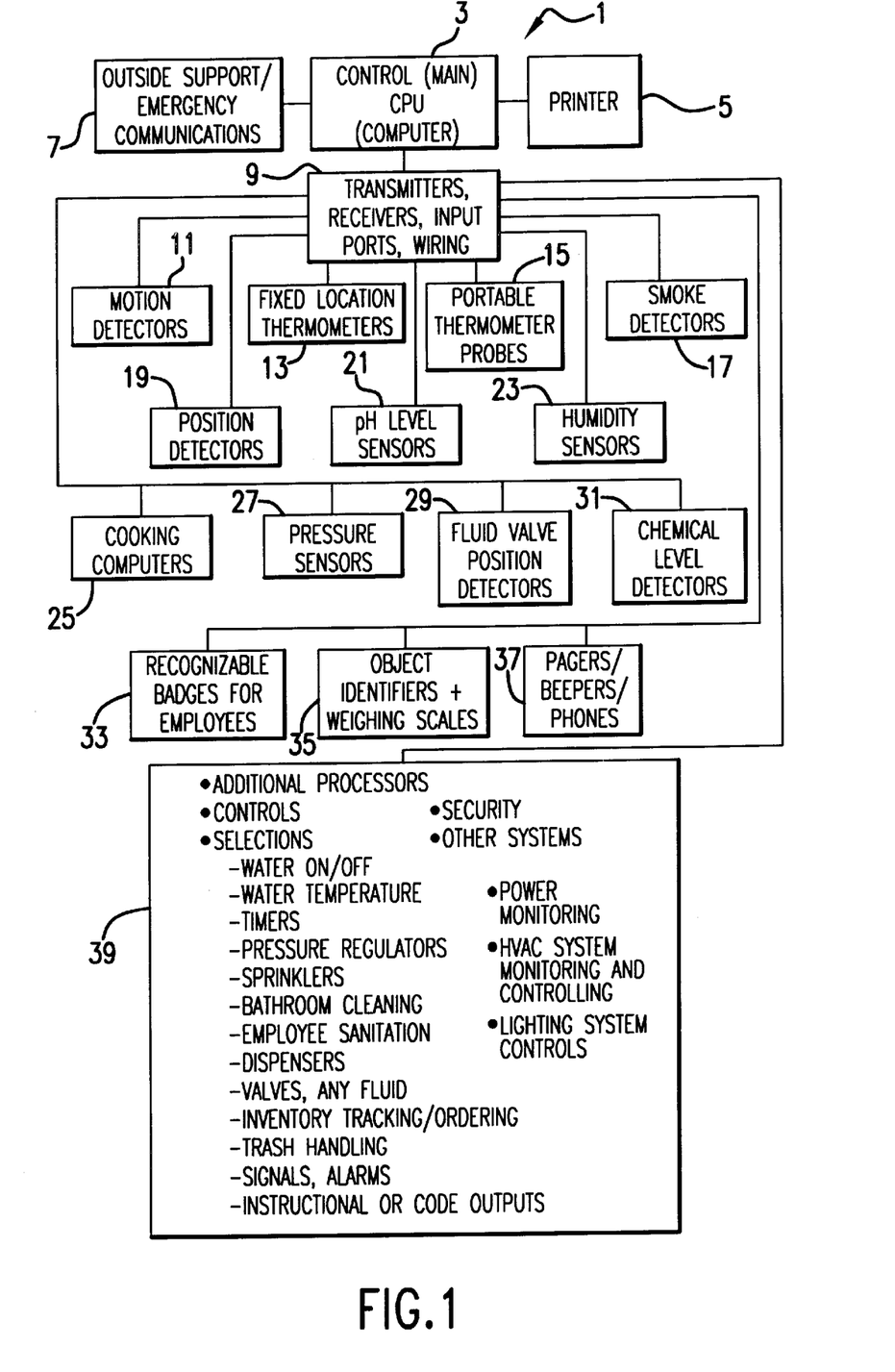
FIG. 1 shows a schematic diagram of an overall present invention monitoring system for a food service establishment.

FIG. 1 illustrates a flow diagram generally showing various features of one preferred embodiment of the present invention, system for monitoring food service requirements for compliance at a food service establishment. In FIG. 1, present invention system 1 includes a control CPU 3. This may be a main computer or more than one computer connected to one another, the exact still and layout being a matter of choice for the artisan. CPU 3 is connected to one or more printers and to outside support and emergency services via communications 7 (via modems, radio signals, or any other available communications technology). CPU 3 is also connected to an interface unit shown as block 9 which includes transmitters, receivers, input and output ports and wiring. This is communicated via those mechanisms to all other equipment within the system, including: motion detectors 11, fixed location thermometers 13, portable thermometer probes 15, smoke detectors 17, position detectors 19, pH level sensors 21, humidity sensors 23, cooking computers 25, pressure sensors 27, fluid valve position detectors 29, chemical level detectors 31, recognizable badges for employees 33, object identifiers and weighing scales 35, and pagers, beepers and phones 37. It is also connected to that which is shown in block 39. Block 39 includes additional processors (computers and data storage and processing as may be desired), additional controls, a security system and various other options such as those listed in block 39. Additional optional sub-systems may be included and equivalent technology may be substituted in place of those described. For example, in place of readable badges or signaling badges for individual employees, equivalent substitute technology may be finger print identifiers, retina identifiers, or any other unique body area identifier.

Figure 2:
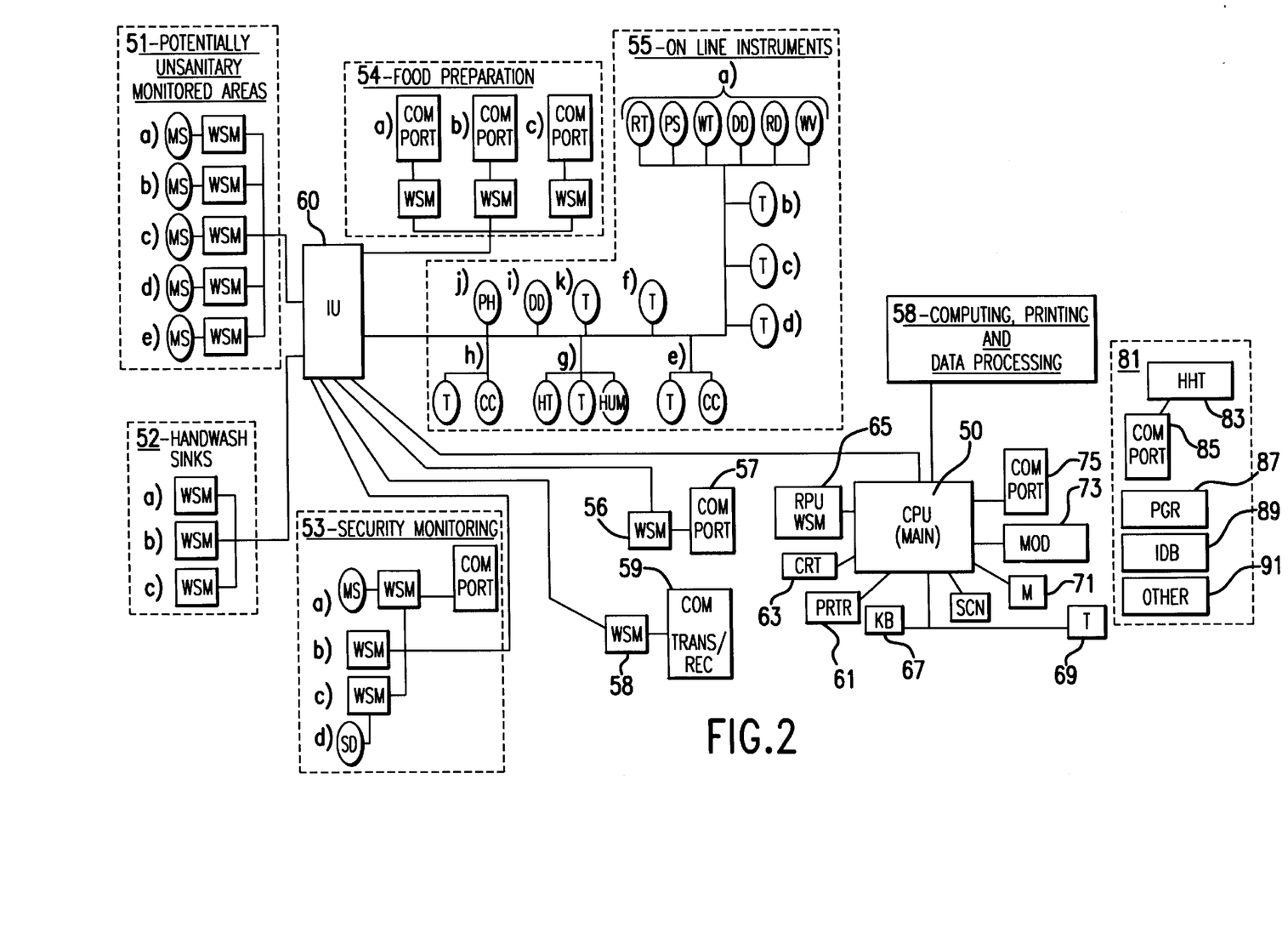
FIG. 2 shows a flow diagram of a typical present invention system detailing work station and other locations and connections; and, FIGS. 3, 4, 5, and 6 show various types of work station monitor display configurations.
Figure 3:
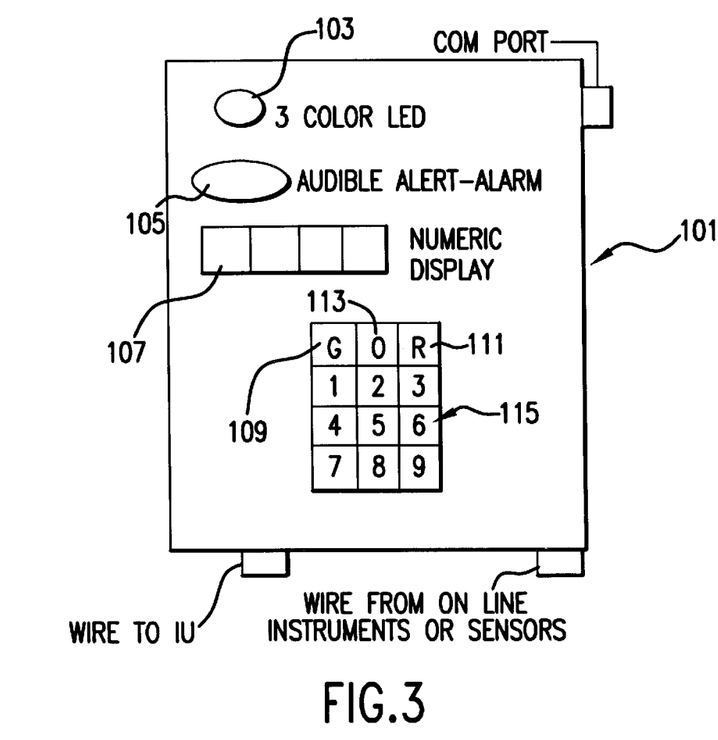
Figure 4:
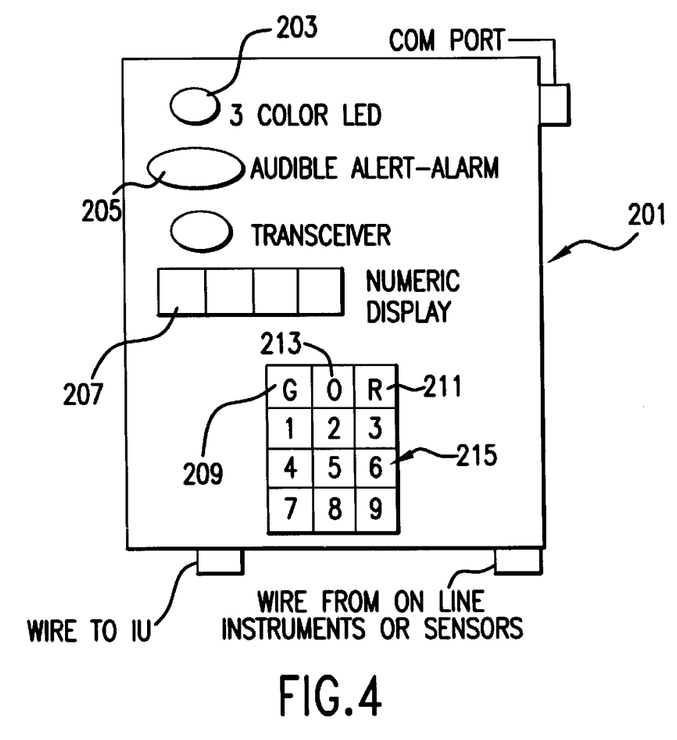
Figure 5:
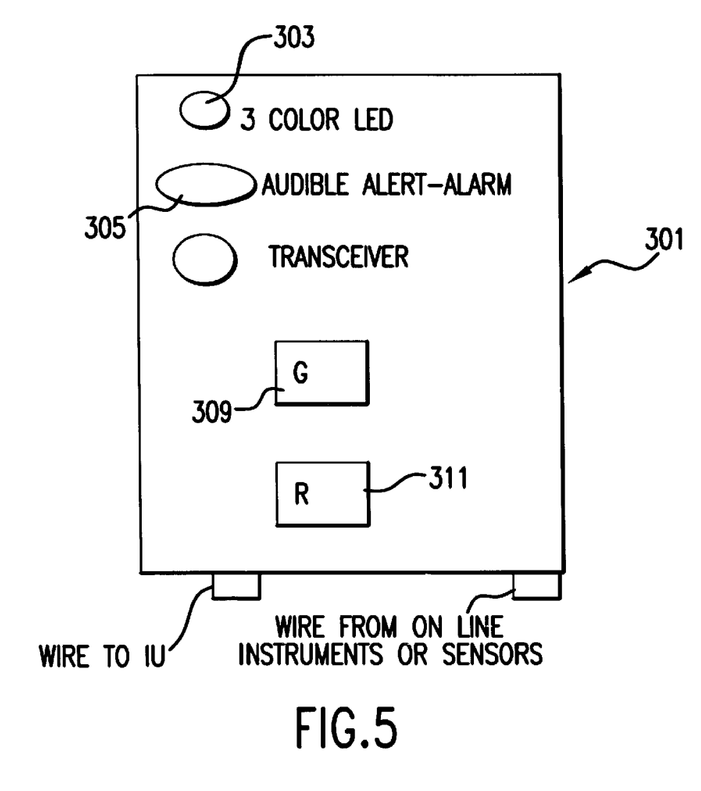
Figure 6:
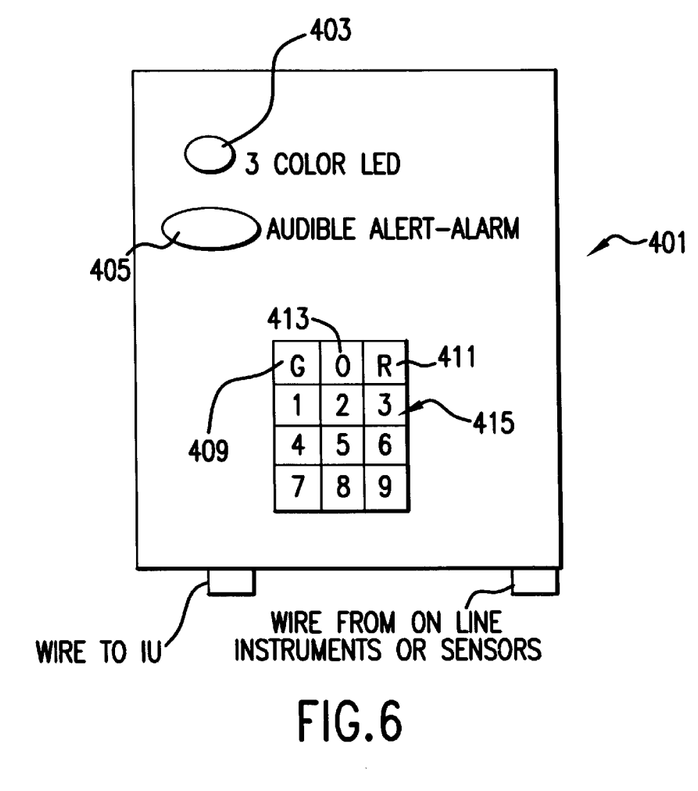

FIG. 2 shows a diagrammatical illustration of actual present invention embodiment. Here, CPU 50 is the main control center with multi-tasking capabilities and is connected to interface unit 60. CPU 50 includes printer 61, monitor 63, a reprogramming unit 65 for work station monitors, a key board 67, a thermometer 69, a mouse 71, a modem 73 and communications port 75. Interface unit 60 is connected through wiring, radio signals, or other available communications systems to required sanitary areas 51, to wash sinks 52, to security subsystems 53, to food preparation areas 54, and to online instruments 55, as well as individual work station monitors 56 and 58 with communications port 57 and communications transmitter receiver 59, respectively. Potentially unsanitary monitored areas in block 51 are shown as a, b, C, d, and e, to represent motion sensors connected to their respective work stations. Block 52 shows hand wash sinks a, b and c, with work station monitors to assure that employees wash their hands and are sanitary using the available technology described above. Block 53 includes security monitoring with motion sensor a at its work station with a communications port and work stations b and c along with smoke detector d. Security monitor could include the use of passes for entry to secured areas, motion sensors, window and door monitoring, and other types of security subsystems as well as computer security where incorrect passwords are repeatedly used to attempt entry into limited access computer areas, food preparation area 54, as work station monitors a, b and c with appropriate communication ports and are described in great detail above.

Block 55 includes online instrumentation a which contains rinse water temperature sensors, wash water sensors, pressure sensors, detergent dispensers, rinse agent dispensers and water valve sensors and controllers. The water valve controller may simply be overrides, actual controllers are not included. Also included are thermometers at locations b, c, d, e, f, g, h, and k. These may be monitoring ovens, refrigeration, cool areas or even room temperature storage areas, location e includes a cooking computer for user to program for various cooking tasks for random or total monitoring. Location g includes a timer, thermometer, and humidity sensor. Location h is similar to location e described above. Location j includes a pH sensor and location i includes a data collection center.

All of the above areas, in all of the blocks described will include monitoring. Some will include monitoring and control, and others will include interactive monitoring and control, as described more fully above.

Hand held units acting as portable systems are shown illustratively in block 81 and may include hand held thermometers with memory 83 and communication port 85 or other signalling mechanisms. Pagers 87, or other signalling mechanisms may be included, as well as identification badges 89, or other equivalent identifying devices. Other instruments 91 may include radio signal hand held or wrist computers, wireless two-way walkie talkies, wireless phones, wireless headphones, or their equivalent.

FIGS. 3, 4, 5, and 6 respectively show diagnostic views of four possible configurations for typical work station monitor face configuration utilized in present invention, shown as devices 101, 201, 301 and 401, respectively. Each of these include color signaling lights 103, 203, 303 and 403, as well as audio alert alarms 105, 205, 305 and 405. Devices 101 and 201 include numeric displays 107 and 207. Each of these devices also include at least green signals 109, 209, 309 and 409, as well as red signals 111, 211, 311 and 411. Devices 101, 201 and 401 include orange signals 113, 213 and 413. Devices 101, 201 and 401 also include a ten (one through nine plus zero) digit key board 115, 215 and 415, respectively.

As mentioned above, the present invention system will be utilized in many locations and these could include: kitchens, restrooms, hand wash stations, any potentially unsanitary areas, janitorial supply closets, break rooms, trash rooms, trash compactors, scrap table or dirty dish room or area, front-lined sinks, back room sinks, employee reporting station time clocks, safes, sprinklers, smoke detectors, food preparation areas, ovens, preparation tables, mechanical controls such as heating, air conditioning, and lighting systems, refrigerators, freezers, chillers, fryers, cabinets, sanitizers, grills, finished food line up areas, food and beverage pick up areas, and others.

Obviously, numerous modifications and variations of the present invention are possible in light of the above teachings. It is therefore understood that within the scope of the appended claims, the invention may be practiced otherwise than as specifically described herein.

What is claimed is:

1. A system for monitoring and controlling food service requirements at a food service establishment, which comprises:
   a) a computer having a main central processing unit, and including input and output devices and at least one printer/CRT screen monitor;
   b) an interface unit connected to or integrally a part of said computer, which includes means for transmitting and receiving information to and from a plurality of monitoring means and a plurality of control means to be located within said food service establishment;
   c) a plurality of communications ports connected to said interface unit for insertion of portable devices;
   d) the plurality of monitoring means, including:
      (i) a plurality of function monitoring means to monitor at least temperature at different locations, including fixed location thermometers and portable thermometers, smoke detectors and motion detectors, each of said function monitoring means having information feedback mechanisms connected to said interface unit; and,
      (ii) a plurality of employee monitoring means, including identification badges for individual employees with unique codes having instrument-readable identifiers or signals, and employee location monitors capable of sensing said badges and having information feedback mechanisms connected to said interface unit;
   (e) the plurality of control means, including:
      (i) a plurality of function control means to control at least temperature and to set off signals for smoke detection, said function control means being connected to said interface unit;
      (ii) a plurality of interactive control means including interactive work station monitors with output and feedback mechanisms, including means for communicating action codes to employees and means for employees to communicate in response thereto, said interactive control means being connected to said interface unit;
   (f) at least one refrigeration system connected to said plurality of function monitoring means for monitoring temperature therein; said at least one refrigeration system also being connected to said plurality of control means for controlling temperature therein;
   (g) at least one cooking system connected to said plurality of function monitoring means for monitoring temperature therein;
   (h) sufficient software contained within said computer to perform monitoring, controlling, signalling, transmitting and receiving information via said interface unit to and from said plurality of monitoring and control means; and,
   (i) a plurality of instructional code manuals.

2. The system of claim 1 wherein said interactive control means include interactive work stations which include monitors which have light signals, alarms, a code display and a feedback keyboard.

3. The system of claim 2 wherein each said monitor is a fixed monitor directly connected to said interface unit.

4. The system of claim 2 wherein at least one of said monitors is a portable unit and contains a communications port.

5. The system of claim 1 wherein said plurality of function monitoring means includes a security monitoring subsystem with alarms.

6. The system of claim 1 wherein said plurality of function monitoring means include inventory monitoring on consumable products and said computer includes sufficient software for reordering products when inventory drops below a predetermined level.

7. The system of claim 1 wherein said plurality of function monitoring means include means for monitoring sanitary conditions at a plurality of sink locations.

8. The system of claim 1 wherein said function monitoring means includes monitoring cooking activities, including thermometer and time measurement means.

9. The system of claim 1 wherein said function monitoring means include pH level detectors.

10. The system of claim 1 wherein said function monitoring means include humidity level detectors.

11. The system of claim 1 wherein said system further includes a plurality of beepers for signalling employees to communicate with said computer or its operator.

12. The system of claim 1 wherein said system further includes a communications link to outside emergency support services, including fire and police services.

13. The system of claim 1 wherein said control means include lighting control means with preprogrammed timing for turning lighting on and off at a plurality of locations.

14. The system of claim 1 wherein said control means include monitoring and controlling at least one heating, ventilating and air conditioning system.

* * * * *